United States Patent
Kuo

(10) Patent No.: US 9,161,153 B2
(45) Date of Patent: Oct. 13, 2015

(54) METHOD OF HANDLING CSI REPORT AND RELATED COMMUNICATION DEVICE

(71) Applicant: Industrial Technology Research Institute, Hsinchu (TW)

(72) Inventor: Ping-Heng Kuo, New Taipei (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 108 days.

(21) Appl. No.: 13/909,091

(22) Filed: Jun. 4, 2013

(65) Prior Publication Data

US 2013/0336244 A1 Dec. 19, 2013

Related U.S. Application Data

(60) Provisional application No. 61/659,996, filed on Jun. 15, 2012.

(51) Int. Cl.
*H04W 4/00* (2009.01)
*H04L 1/00* (2006.01)

(52) U.S. Cl.
CPC .............. *H04W 4/00* (2013.01); *H04L 1/0029* (2013.01)

(58) Field of Classification Search
None
See application file for complete search history.

(56) References Cited

U.S. PATENT DOCUMENTS

2010/0278058 A1  11/2010  Damnjanovic
2012/0088533 A1*  4/2012  Khoshnevis et al. ......... 455/509
2012/0140708 A1  6/2012  Choudhury
2012/0257605 A1*  10/2012  Abraham et al. .............. 370/338
2013/0083683 A1*  4/2013  Hwang et al. .................. 370/252
2014/0286276 A1*  9/2014  Lunttila et al. ................ 370/329

FOREIGN PATENT DOCUMENTS

| EP | 2 562 951 A1 | 2/2013 |
| WO | 2007112371 A1 | 10/2007 |
| WO | 2009119988 A1 | 10/2009 |
| WO | 2011132727 A1 | 10/2011 |
| WO | 2012044865 A1 | 4/2012 |

OTHER PUBLICATIONS

Panasonic, CSI feedback configuration, triggering, and behaviour, 3GPP TSG RAN WG1 Meeting 69, R1-122188, May 21-25, 2012, XP050600452, Prague, Czech Republic.
Panasonic et al, Correction to periodic CSI reports for carrier aggregation, 3GPP TSG-RAN WG1 Meeting #67, R1-114361, Nov. 14-18, 2011, XP050562555, San Francisco, USA.
Texas Instruments, All Sub-band Differential CQI Feedback for E-UTRA, 3GPP TSG RAN WG1 51, R1-074694, Nov. 5-9, 2007, pp. 1-5, XP050108169, Jeju, Korea.

* cited by examiner

*Primary Examiner* — David Oveissi
(74) *Attorney, Agent, or Firm* — Winston Hsu; Scott Margo

(57) ABSTRACT

A method of handling channel state information (CSI) reports for a communication device in a wireless communication system comprises determining at least one field difference between a reference CSI report and at least one CSI report; transmitting the reference CSI report to a network of the wireless communication system; and transmitting the at least one field difference to the network, to transmit the at least one CSI report to the network, respectively; wherein the at least one CSI report corresponds to at least one component carrier, respectively, corresponds to at least one transmission point in the network, respectively, or corresponds to at least one coordinated multipoint (CoMP) configuration, respectively.

10 Claims, 6 Drawing Sheets

| Bit value | CQI difference |
|---|---|
| 00 | 0 |
| 01 | +1 |
| 10 | −1 |
| 11 | >+3 |

METHOD OF HANDLING CSI REPORT AND RELATED COMMUNICATION DEVICE

CROSS REFERENCE TO RELATED APPLICATIONS

This application claims the benefit of U.S. Provisional Application No. 61/659,996, filed on Jun. 15, 2012 and entitled "Reporting Mechanism for Multiple Sets of Channel State Information", the contents of which are incorporated herein in their entirety.

BACKGROUND OF THE INVENTION

1. Field of the Invention

The present invention relates to a method used in a wireless communication system and related communication device, and more particularly, to a method of handling a channel state information (CSI) report and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmission/reception, UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

In detail, when the CoMP is configured to a UE and multiple transmission points, the UE may communicate with the transmission points simultaneously, i.e., access a service via all or part of the transmission points. For example, a transmission point can be an eNB, a relay node or a remote antenna of an eNB (e.g., remote radio head (RRH)). More specifically, an eNB may manage only one transmission point, or may manage multiple transmission points. That is, Cell IDs of different transmission points may be different (e.g., when being managed by different eNBs), or may be the same (e.g., when being managed by the same eNB). Thus, signals transmitted between the UE and the transmission points can be easily recovered due to better quality of the signals.

The CA is introduced to the LTE-A system by which more than one component carriers (CCs) are aggregated to achieve a wide-band transmission. Accordingly, the LTE-A system can support a wide bandwidth up to 100 MHz by aggregating a maximum number of 5 CCs, where a maximum bandwidth of each CC is 20 MHz and is backward compatible with the 3GPP Rel-8 standard. The LTE-A system supports the CA for both contiguous and non-contiguous CCs. The CA increases bandwidth flexibility by aggregating the CCs. When a UE is configured with the CA, the UE has the ability to receive and/or transmit packets on one or multiple CCs to increase throughput.

However, when the UE is configured with the CA or the CoMP, the UE may need to report a large amount of sets of channel information to the eNB, to communicate with the network regularly. For example, the channel information corresponding to multiple component carriers or the channel information between the UE and multiple transmission points may be needed to be reported periodically. The reporting periods of these multiple sets of channel state information may be configured to be different, so occasionally two or more sets of channel state information might have to be reported at the same time (such event can be seen as collision). However, due to the limited radio resource, the capacity of uplink control channels may not be sufficient to simultaneously contain multiple sets of channel state information (CSI). The eNB cannot communicate with the UE efficiently, if part of the channel information is lost due to the collision.

Thus, efficient reporting of multiple sets of channel information is an important topic to be discussed.

SUMMARY OF THE INVENTION

The present invention therefore provides a method and related communication device for handling a channel state information (CSI) report to solve the abovementioned problem.

A method of handling channel state information (CSI) reports for a communication device in a wireless communication system comprises determining at least one field difference between a reference CSI report and at least one CSI report; transmitting the reference CSI report to a network of the wireless communication system; and transmitting the at least one field difference to the network, to transmit the at least one CSI report to the network, respectively; wherein the at least one CSI report corresponds to at least one component carrier, respectively, corresponds to at least one transmission point in the network, respectively, or corresponds to at least one coordinated multipoint (CoMP) configuration, respectively.

A method of handling a channel state information (CSI) report for a communication device in a wireless communication system comprises omitting at least one field in a CSI report, when the CSI report collides with another CSI report; and transmitting the CSI report to a network of the wireless communication system; wherein the CSI report corresponds to a component carrier, a transmission point in the network, or a coordinated multipoint (CoMP) configuration.

A method of handling channel state information (CSI) reports for a communication device in a wireless communication system comprises dropping at least a first CSI report, when the at least a first CSI report collides with at least a second CSI report; and transmitting the at least a second CSI report and an indicator to a network of the wireless communication system, wherein the indicator indicates the at least a first CSI report or the at least a second CSI report; wherein the at least a first CSI report and the at least a second CSI report correspond to a plurality of component carriers, respectively, correspond to a plurality of transmission points of the network, respectively, or correspond to a plurality of coordinated multipoint (CoMP) configurations, respectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
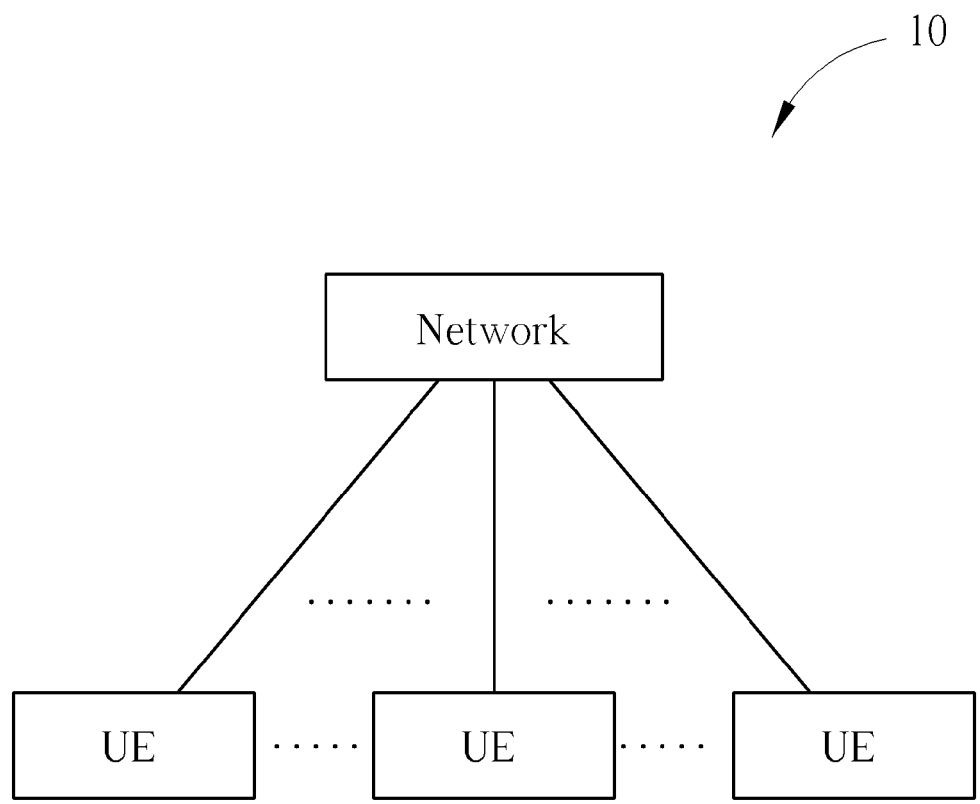
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of user equipments (UEs). In FIG. 1, the network and the UEs are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). In another example, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

In one example, the network and the UEs may support coordinated multipoint (CoMP) transmission/reception, and the UEs can communicate with transmission points (TPs) in the network according to the CoMP. In detail, the CoMP can be classified into two main categories: Joint Processing (JP) and Coordinated Scheduling/Beamforming (CS/CB). A main difference between the JP and the CS/CB is that data of the UE is available at all the transmission points when the JP is configured (i.e. enabled), while the data of the UE is only available at a serving point (i.e., serving cell) when the CS/CB is configured. The JP can be further classified into two categories: joint transmission and dynamic point selection. When the joint transmission is configured, the data of the UE can be transmitted from multiple transmission points (e.g., coherently or noncoherently) to the UE to improve signal quality and/or cancel interferences. When the dynamic point selection is configured, the data of the UE is transmitted from only one of the transmission points (e.g., according to a choice or suggestion of the UE) to the UE to improve the signal quality and/or avoid the interferences. On the other hand, when the CS/CB is configured, the data of the UE is only transmitted from the serving point to the UE, while other transmission points may adjust scheduling (e.g., stop their transmissions), or adjust beamforming (e.g., move their beams) to mitigate the interferences. In addition, the CoMP may also be a dynamic point blanking (DPB). In another example, the network and the UEs may support carrier aggregation (CA), and the UEs can communicate with the network via multiple component carriers according to the CA.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a UE, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network. A UE can be a mobile phone, a laptop, a tablet computer, an electronic book or a portable computer system. Besides, the network and the UE can be seen as a transmitter or a receiver according to direction, e.g., for an uplink (UL), the UE is the transmitter and the network is the receiver, and for a downlink (DL), the network is the transmitter and the UE is the receiver.

Figure 2:
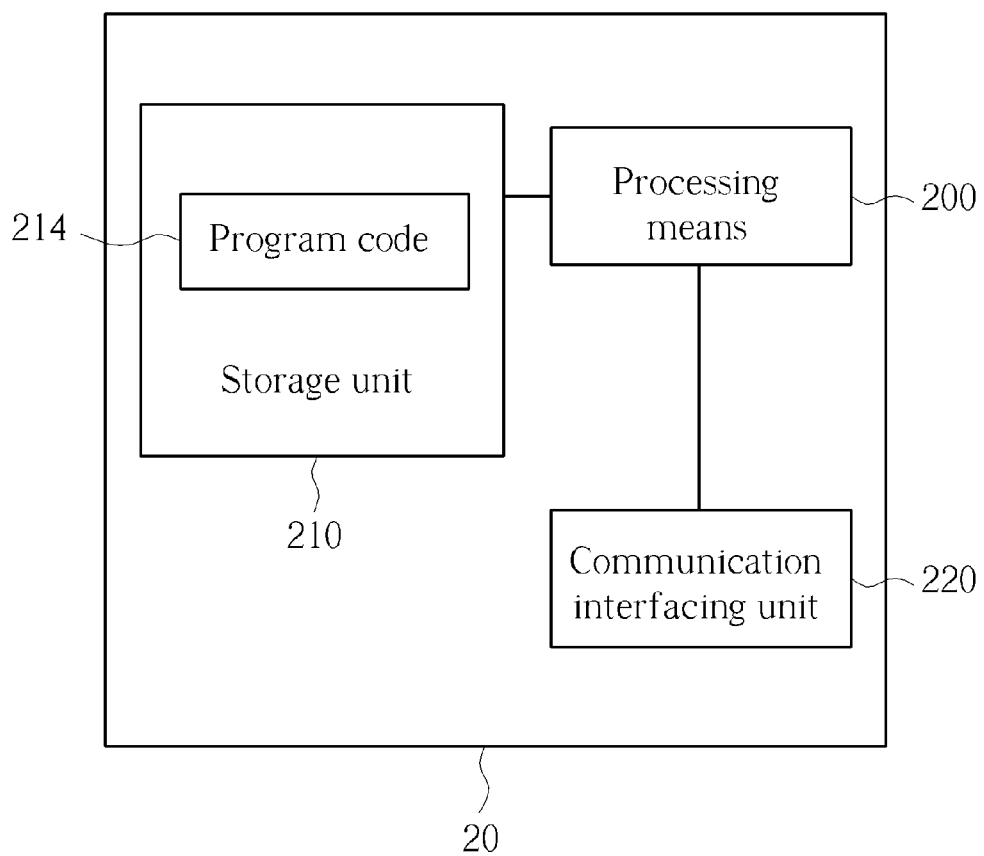
FIG. 2 is a schematic diagram of a communication device according to an example of the present invention.

Please refer to FIG. 2, which is a schematic diagram of a communication device 20 according to an example of the present invention. The communication device 20 can be a UE or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
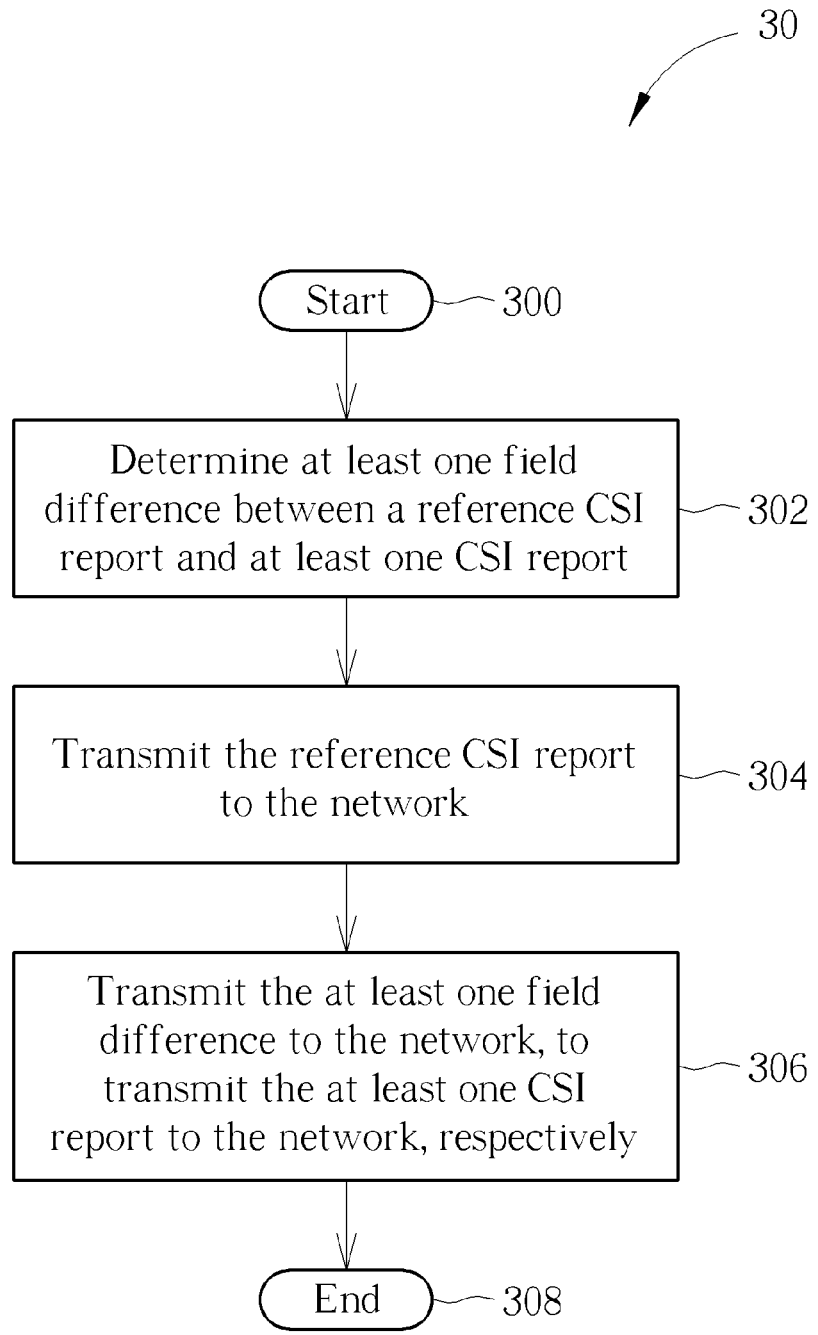
FIG. 3 is a flowchart of a process according to an example of the present invention.

Please refer to FIG. 3, which is a flowchart of a process 30 according to an example of the present invention. The process 30 can be utilized in the UE shown in FIG. 1, for handling multiple channel state information (CSI) reports (i.e., CSI processes). The process 30 may be compiled into the program code 214 and includes the following steps:

Step 300: Start.

Step 302: Determine at least one field difference between a reference CSI report and at least one CSI report.

Step 304: Transmit the reference CSI report to the network.

Step 306: Transmit the at least one field difference to the network, to transmit the at least one CSI report to the network, respectively.

Step 308: End.

According to the process 30, the UE first determines at least one field difference between a reference CSI report and at least one CSI report. Then, the UE transmits the reference CSI report to the network, and transmits the at least one field difference to the network, to transmit the at least one CSI report to the network, respectively. In other words, for a CSI report, the UE transmits a field difference between the CSI report and the reference CSI report to the network, instead of transmitting the complete CSI report to the network. The field difference may include one or more difference values between corresponding fields of the CSI report and the reference CSI report. Thus, overhead needed for transmitting the CSI report can be reduced.

Realization of the process 30 is not limited. For example, the at least one CSI report may correspond to at least one component carrier, respectively. That is, when the UE communicates with the network via multiple component carriers according to the CA, the UE needs to feed back the CSI reports corresponding to the component carriers to the network. After the reference CSI report is determined, the UE only needs to transmit the field differences between the reference CSI report and the CSI reports to the network. In another example, the at least one CSI report may correspond to at least one transmission point in the network, respectively. That is, when the UE communicates with multiple transmission points in the network according to the CoMP, the UE needs to feed back the CSI reports corresponding to the transmission points to the network. In this situation, the CSI reports may include channel information between the UE and the transmission points. Similarly, the UE only needs to transmit the field differences between the reference CSI report and the CSI reports to the network. In another example, the at least one CSI report may correspond to at least one CoMP configuration, respectively, wherein a CoMP configuration may be the joint transmission, the dynamic point selection, the CS/CB or the dynamic point blanking. In addition, different CSI reports may correspond to the same CoMP configuration with the same, partly different or different realizations.

Note that detail of a CSI report mentioned above is not limited. For example, the CSI report may include one or more fields which include a Channel Quality Indicator (CQI), a Precoding Matrix Index (PMI), a Rank Indicator (RI) and/or a Precoder Type Indicator (PTI). In addition, the CSI reports may be transmitted in the same subframe or different subframes, and is not limited herein.

Figure 4:
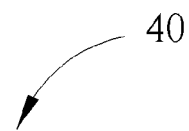
FIG. 4 is a table of CQI differences and corresponding bit values according to an example of the invention.

Please refer to FIG. 4, which is a table 40 of CQI differences and corresponding bit values according to an example of the invention. CQI differences including "0", "+1", "−1" and ">+3" which correspond to bit values "00", "01", "10" and "11" are considered in FIG. 4. For example, if the CQI difference between a CQI and a reference CQI (i.e., CQI_ref) is "+1", i.e., CQI−CQI_ref=1, the UE transmits the bit value "01" to the network, to indicate the difference "+1" to the network. Note that the values and the CQI differences in the table 40 are simply used for illustrating the present invention, and can be modified according to design considerations and system requirements.

Thus, according to the above description and the process 30, overhead needed for transmitting the CSI report can be reduced.

Figure 5:
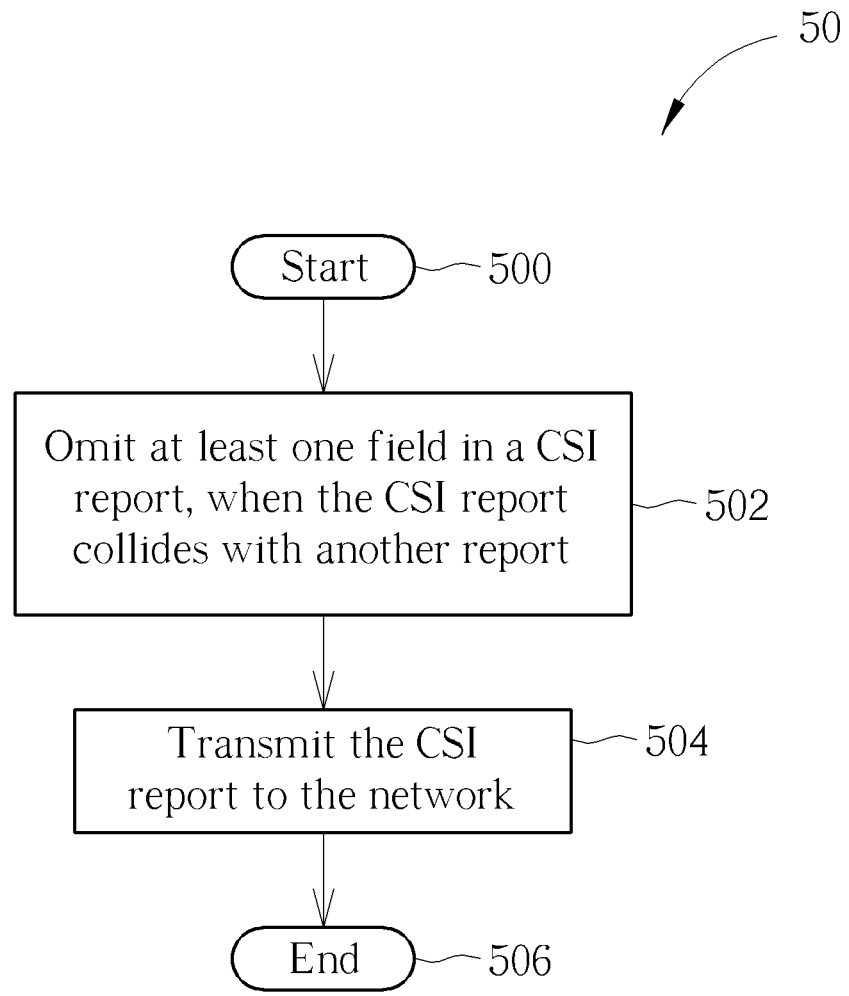
FIG. 5 is a flowchart of a process according to an example of the present invention.

Please refer to FIG. 5, which is a flowchart of a process 50 according to an example of the present invention. The process 50 can be utilized in the UE shown in FIG. 1, for handling a CSI report (i.e., CSI process). The process 50 may be compiled into the program code 214 and includes the following steps:

Step 500: Start.

Step 502: Omit at least one field in a CSI report, when the CSI report collides with another report.

Step 504: Transmit the CSI report to the network.

Step 506: End.

According to the process 50, the UE first omits (e.g., removes) at least one field in a CSI report, when the CSI report collides with another CSI report. Then, the UE transmits the CSI report to the network. In other words, the UE may further compress the CSI report and transmit the compressed CSI report to the network, since the at least one field is omitted. Thus, overhead needed for transmitting the CSI report can be reduced.

Realization of the process 50 is not limited. For example, the CSI report may correspond to a component carrier. That is, when the UE communicates with the network via multiple component carriers according to the CA, the UE needs to feed back the CSI reports corresponding to the component carriers to the network. For one of the CSI reports, the UE first omits one or more fields in the CSI report, and transmit the CSI report to the network. In another example, the CSI report may correspond to a transmission point in the network. That is, when the UE communicates with multiple transmission points in the network according to the CoMP, the UE needs to feed back the CSI reports corresponding to the transmission points to the network. In this situation, the CSI reports may include channel information between the UE and the transmission points. Similarly, for one of the CSI reports, the UE first omits one or more fields in the CSI report, and transmit the CSI report to the network. In another example, the CSI report may correspond to a CoMP configuration, wherein a CoMP configuration may be the joint transmission, the dynamic point selection, the CS/CB or the dynamic point blanking. In addition, different CSI reports may correspond to the same CoMP configuration with the same, partly different or different realizations. After the network receives the CSI report, the network can determine that the at least one field is the same as at least one corresponding field in a reference CSI report. Preferably, the reference CSI report is transmitted to the network, before transmitting the CSI report to the network.

Note that detail of the at least one field in the CSI report mentioned above is not limited. For example, the at least one field may include a CQI, a PMI, a RI and/or a PTI. For example, the CSI report may include the fields which are the CQI, the PMI and the RI. However, the CSI report may collide with another CSI report. According to the present invention, the UE can omit the RI, and transmit the CSI report including the PMI and the CQI to the network. After the network receives the CSI report with the omitted RI, the network can determine that the RI of the CSI report is the same as a RI of a reference CSI report.

Thus, according to the above description and the process 50, overhead needed for transmitting the CSI report can be reduced.

Figure 6:
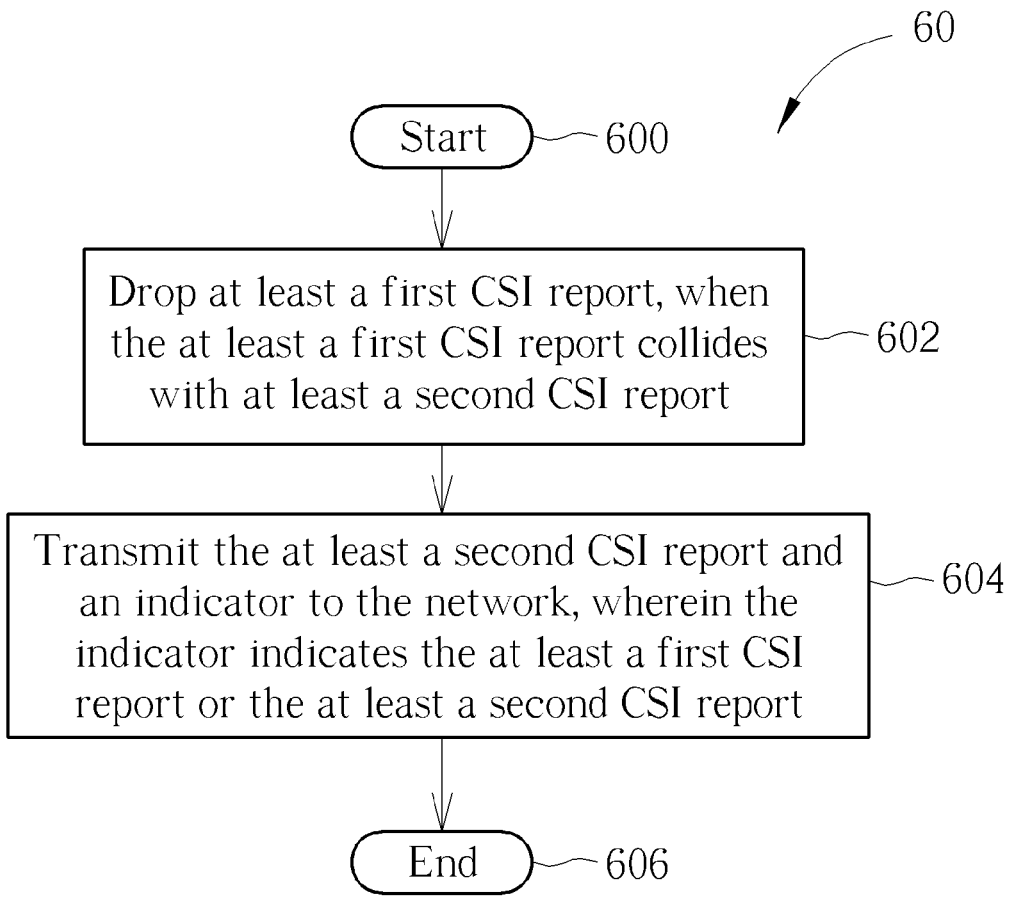
FIG. 6 is a flowchart of a process according to an example of the present invention.

Please refer to FIG. 6, which is a flowchart of a process 60 according to an example of the present invention. The process 60 can be utilized in the UE shown in FIG. 1, for handling CSI reports (i.e., CSI processes). The process 60 may be compiled into the program code 214 and includes the following steps:

Step 600: Start.

Step 602: Drop at least a first CSI report, when the at least a first CSI report collides with at least a second CSI report.

Step 604: Transmit the at least a second CSI report and an indicator to the network, wherein the indicator indicates the at least a first CSI report or the at least a second CSI report.

Step 606: End.

According to the process 60, the UE first drops at least a first CSI report, when the at least a first CSI report collides with at least a second CSI report. Then, the UE transmits the at least a second CSI report and an indicator to the network, wherein the indicator indicates the at least a first CSI report or the at least a second CSI report. For example, when two sets of the CSI reports collide, the UE only transmits one set of the CSI reports to the network, and the other set of the CSI reports is dropped. Further, the UE also transmit an indication to the network, when transmitting the set of the CSI reports. For example, the indication may indicate the transmitted set of the CSI reports. In another example, the indication may indicate the dropped set of the CSI reports. Thus, the network can recognize the transmitted set of the CSI reports and the dropped set of the CSI reports according to the indication. As a result, collision between the CSI reports can be avoided.

Realization of the process 60 is not limited. For example, the at least a first CSI report and the at least a second CSI report may correspond to a plurality of component carriers, respectively. That is, when the UE communicates with the network via multiple component carriers according to the CA, the UE needs to feed back the CSI reports corresponding to the component carriers to the network. When two CSI reports collide, the UE may drop the first CSI report, and transmit the second CSI report and an indication to the network, wherein the indication may indicate the first CSI report or the second CSI report. In another example, the at least a first CSI report and the at least a second CSI report may correspond to a plurality of transmission points of the network, respectively. That is, when the UE communicates with multiple transmission points in the network according to the CoMP, the UE needs to feed back the CSI reports corresponding to the transmission points to the network. In this situation, the CSI reports may include channel information between the UE and the transmission points. Similarly, when two CSI reports collide, the UE may drop the first CSI report, and transmit the second CSI report and an indication to the network, wherein the indication may indicate the first CSI report or the second CSI report. In another example, the at least a first CSI report and the at least a second CSI report may correspond to a plurality of CoMP configurations, respectively, wherein a CoMP configuration may be the joint transmission, the dynamic point selection, the CS/CB or dynamic point blanking. In addition, different CSI reports may correspond to the same CoMP configuration with the same, partly different or different realizations.

Note that detail of a CSI report mentioned above is not limited. For example, the CSI report may include one or more fields which may include a CQI, a PMI, a RI and/or a PTI. On the other hand, the indicator mentioned above may include at least one identity corresponding to the at least a first CSI report or the at least a second CSI report. For example, the indicator may include an identity of a dropped CSI report for indicating the dropped CSI report, or an identity of a transmitted CSI report for indicating the transmitted CSI report. A method according to which the UE determines that the first CSI report and the second CSI report collide is not limited. For example, the UE may determine that the first CSI report and the second CSI report collide, when the first CSI report and the second CSI report collide are scheduled to be transmitted via the same resource (e.g., the same subframe, the same resource blocks, etc).

Thus, according to the above description and the process 60, collision between the CSI reports can be avoided.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method for handling CSI reports. Overhead needed for transmitting the CSI report can be reduced, and collision between the CSI reports can be avoided. Thus, performance of the wireless communication system can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling channel state information (CSI) reports for a communication device in a wireless communication system, the method comprising:
    determining at least one field difference between a reference CSI report and at least one CSI report;
    transmitting the reference CSI report to a network of the wireless communication system;
    determining at least one value corresponding to the at least one field difference according to a predetermined table; and
    transmitting the at least one value indicating the at least one field difference to the network;
    wherein the at least one CSI report corresponds to at least one component carrier, respectively, corresponds to at least one transmission point in the network, respectively, or corresponds to at least one coordinated multipoint (CoMP) configuration, respectively.

2. The method of claim 1, wherein one of the at least one CSI report comprises at least one field which comprises at least one of a Channel Quality Indicator (CQI), a Precoding Matrix Index (PMI), a Rank Indicator (RI) and a Precoder Type Indicator (PTI).

3. A method of handling a channel state information (CSI) report for a communication device in a wireless communication system, the method comprising:
    omitting at least one field in a CSI report, when the CSI report collides with another CSI report; and
    transmitting the CSI report where the at least one field is omitted to a network of the wireless communication system;
    wherein the CSI report corresponds to a component carrier, a transmission point in the network, or a coordinated multipoint (CoMP) configuration.

4. The method of claim 3, wherein the network determines that the at least one field is the same as at least one corresponding field in a reference CSI report.

5. The method of claim 4, wherein the reference CSI report is transmitted to the network, before transmitting the CSI report to the network.

6. The method of claim 3, wherein the at least one field comprises at least one of a Channel Quality Indicator (CQI), a Precoding Matrix Index (PMI), a Rank Indicator (RI) and a Precoder Type Indicator (PTI) in the CSI report.

7. A method of handling channel state information (CSI) reports for a communication device in a wireless communication system, the method comprising:
    dropping at least a first CSI report, when the at least a first CSI report collides with at least a second CSI report; and
    transmitting the at least a second CSI report and an indicator to a network of the wireless communication system, wherein the indicator indicates the at least a first CSI report or the at least a second CSI report;
    wherein the at least a first CSI report and the at least a second CSI report correspond to a plurality of component carriers, respectively, correspond to a plurality of transmission points of the network, respectively, or correspond to a plurality of coordinated multipoint (CoMP) configurations, respectively.

8. The method of claim 7, wherein one of the at least a first CSI report and the at least a second CSI report comprises at least one of a Channel Quality Indicator (CQI), a Precoding Matrix Index (PMI), a Rank Indicator (RI) and a Precoder Type Indicator (PTI).

9. The method of claim 7, wherein the indicator comprises at least one identity corresponding to the at least a first CSI report or the at least a second CSI report.

10. The method of claim 7, wherein the at least a first CSI report collides with the at least a second CSI report, when the at least a first CSI report collides with the at least a second CSI report are scheduled to be transmitted via the same resource.

* * * * *